United States Patent [19]

Sakurai

[11] Patent Number: 4,638,294
[45] Date of Patent: Jan. 20, 1987

[54] UNAUTHORIZED ENTRY DETECTION SYSTEM

[75] Inventor: Takashi Sakurai, Nagoya, Japan

[73] Assignee: Nippondenso Co., Ltd., Kariya, Japan

[21] Appl. No.: 633,443

[22] Filed: Jul. 23, 1984

[30] Foreign Application Priority Data

Jul. 25, 1983 [JP] Japan .................. 58-135486

[51] Int. Cl.$^4$ ...................... B60R 25/00; G08B 13/18
[52] U.S. Cl. ..................... 340/63; 180/287; 307/10 AT; 340/553
[58] Field of Search .................. 340/552, 63, 64, 553, 340/52 R, 554; 343/894, 5 PD; 361/182; 307/10 AT; 180/286, 287; 331/65, 96, 107 DP

[56] References Cited

U.S. PATENT DOCUMENTS

| | | | |
|---|---|---|---|
| 2,247,246 | 6/1941 | Lindsay et al. | 340/553 |
| 3,041,592 | 6/1962 | Schmidt | 340/553 X |
| 3,599,196 | 8/1971 | Boyko | 340/552 |
| 3,634,884 | 1/1972 | Ross | 340/553 |
| 3,688,256 | 8/1972 | D'Ausilio et al. | 340/63 |
| 3,727,181 | 4/1973 | Robbins et al. | 340/552 X |
| 3,732,555 | 5/1973 | Strenglein | 340/63 |
| 4,155,078 | 5/1979 | Bowling et al. | 340/552 X |
| 4,159,466 | 6/1979 | Mengel | 340/63 |
| 4,291,237 | 9/1981 | Kitano | 307/10 AT |
| 4,435,649 | 3/1984 | Vandigriff | 180/287 X |
| 4,475,089 | 10/1984 | Kahnke | 340/553 X |

FOREIGN PATENT DOCUMENTS

3003887 8/1981 Fed. Rep. of Germany ...... 340/552

OTHER PUBLICATIONS

Henney, "Cavity Resonators", *Radio Engineering Handbook*, fifth edition, pp. 46–49 (chapter 6), 1959.

*Primary Examiner*—James L. Rowland
*Assistant Examiner*—Thomas J. Mullen, Jr.
*Attorney, Agent, or Firm*—Cushman, Darby & Cushman

[57] ABSTRACT

In an unauthorized entry detection system for automotive vehicles, an oscillator is installed within the passenger compartment of the vehicle to generate an electromagnetic wave with a predetermined frequency defined by the interior size of the compartment, a first antenna connected to the oscillator to propagate the electromagnetic wave in the whole interior of the compartment in such a manner that the compartment resonates as a cavity resonator when all the doors and windows are closed, a second antenna arranged within the compartment to generate an induced voltage in response to the magnetic field component of the propagated electromagnetic wave, and a detecting circuit connected to the second antenna to detect a change of the induced voltage level caused by entry of a human body into the compartment and/or opening of the doors or windows, thereby to generate a detection signal therefrom.

11 Claims, 4 Drawing Figures

UNAUTHORIZED ENTRY DETECTION SYSTEM

BACKGROUND OF THE INVENTION

The present invention relates to an unauthorized entry detection system adapted to detect an unauthorized entry into the passenger compartment of an automotive vehicle.

Even when all the doors and windows of the vehicle are closed and locked in a parking area, a thief can break the window to take valuable things or to open the door and enter into the passenger compartment so as to start the vehicle. Such a theft will occur when the door is opened in an unauthorized manner during parking of the vehicle.

SUMMARY OF THE INVENTION

It is, therefore, a primary object of the present invention to provide an unauthorized entry detection system capable of detecting unauthorized entry into the passenger compartment of an automotive vehicle.

The fundamental concept of the present invention is based on the fact that the passenger compartment, surrounded by metallic plates, functions as a kind of cavity resonator. Accordingly, the primary object is accomplished by providing an unauthorized entry detection system which comprises first means for generating an electromagnetic wave with a predetermined frequency defined by the interior size of the passenger compartment of the vehicle to propagate it in the whole interior of the passenger compartment in such a manner that the passenger compartment resonates as a cavity resonator when all the doors and windows are closed, second means for generating an induced voltage in response to the magnetic field component of the propagated electromagnetic wave, and third means responsive to the induced voltage from said second means for detecting change of the induced voltage level caused by entry of a human body into the passenger compartment and/or opening of the doors or windows to generate a detection signal therefrom.

In a preferred embodiment, the first means comprises an oscillator for generating an oscillation signal with a predetermined frequency defined by the interior size of the passenger compartment, a first antenna installed within the passenger compartment and connected with the oscillator to generate an electromagnetic wave with the predetermined frequency so as to propagate it in the whole interior of the passenger compartment. The second means comprises a second antenna installed within the passenger compartment to generate an induced voltage in response to the magnetic field component of the electromagnetic wave propagated in the passenger compartment. The third means comprises a detecting circuit connected to the second antenna to detect changes of the induced voltage level so as to generate an output signal in response to a drop of the induced voltage level below a predetermined level. In the actual practices of the detection system, the detecting circuit is connected to an alarm circuit which includes an alarm buzzer to be triggered by the output signal from the detecting circuit. Preferably, the detecting circuit is connected to an anti-theft circuit which is arranged to kill the ignition of the vehicle engine and/or block the fuel line of the vehicle engine in response to the output signal from the detecting circuit.

BRIEF DESCRIPTION OF THE DRAWINGS

Additional objects and advantages of the present invention will become readily apparent from the following detailed description of the preferred embodiment thereof when taken together with the accompanying drawings, in which.

DETAILED DESCRIPTION OF THE PREFERRED EMBODIMENT

Figure 1:
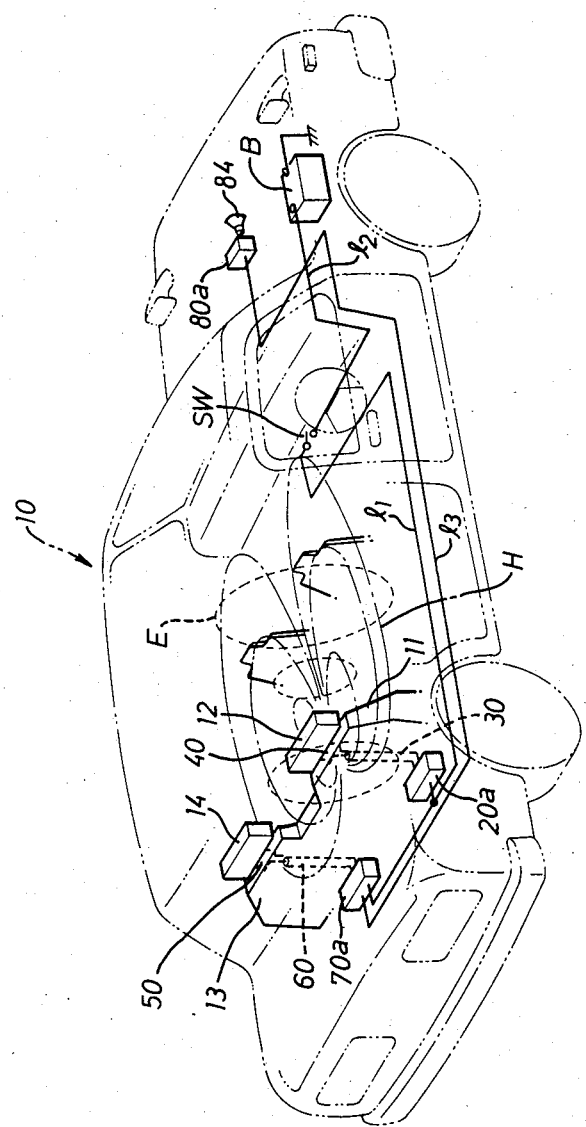
FIG. 1 illustrates an automotive vehicle which is equipped with an unauthorized entry detection system in accordance with the present invention.
Figure 2:
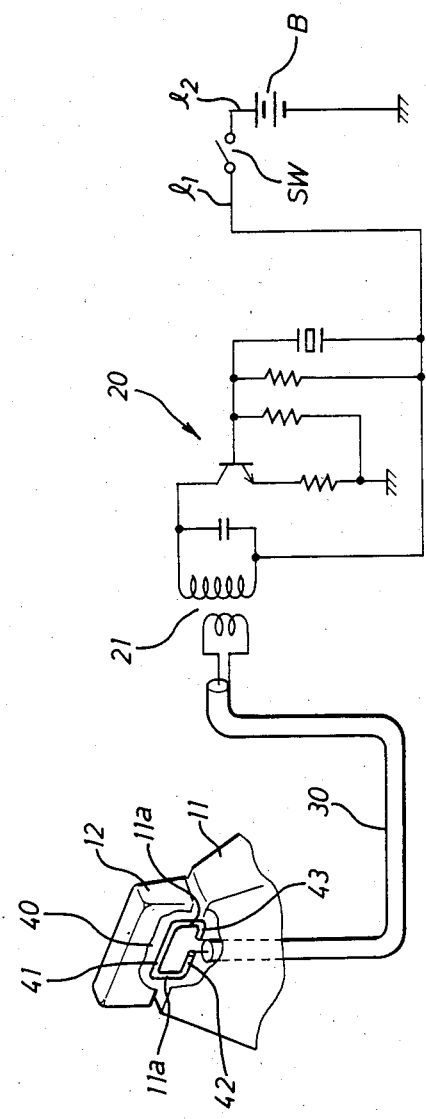
FIG. 2 is a diagram of an oscillator for the detection system.

Referring now to the drawings, FIG. 1 illustrates an automotive vehicle 10 equipped therein with an unauthorized entry detection system in accordance with the present invention. As is illustrated in FIGS. 1 and 2, the detection system comprises an oscillator 20 contained within a casing 20a which is installed at a lower portion behind the seat back of a rear passenger seat 11. The detection system further includes a loop-antenna 40, and a coaxial cable 30 concealed by an outer layer of the rear passenger seat 11 to connect the loop antenna 40 with the oscillator 20.

The oscillator 20 is in the form of a crystal oscillator which is connected at its input terminal to a positive terminal of a vehicle battery B by way of a lead wire $l_1$, a user-actuable normally open switch SW and a lead wire $l_2$. When the switch SW is closed, the oscillator 20 is activated by an electric power supply from battery B to generate an oscillation signal with a predetermined frequency from its transformer 21. In this embodiment, as is previously mentioned, the inventor has found the fact that the passenger compartment enclosed by metallic plates functions as a kind of cavity resonator. In view of this fact, the frequency of the oscillation signal is determined to be approximately 140 MHz in consideration with the interior size of the passenger compartment under a condition where all the doors and windows are closed. A half wave length (about 2 m) of the oscillation signal corresponds with a distance between opposite side walls of the passenger compartment or a distance between the ceiling and floor of the passenger compartment.

The user-actuable normally open switch SW is located at an appropriate place invisible and inaccessible from the vehicle exterior. As is illustrated in FIG. 2, the loop antenna 40 includes a pair of upright metallic rods 11a, 11a, an upper lateral rod 41 integral with the upper ends of rods 11a, and a pair of lower lateral rods 42, 43 integral with the lower ends of rods 11a. The upright metallic rods 11a are supported by the seat back of rear passenger seat 11 at their lower ends and fixed at their upper ends to a head rest 12. In such an arrangement, the existence of loop antenna 40 is invisible from the exterior because the upper lateral rod 41 is embedded within the head rest 12 and the lower lateral rods 42, 43 are concealed by the outer layer of the seat back. Thus, the loop antenna 40 is provided at its lower lateral rods 42, 43 with the oscillation signal from the transformer 21 of oscillator 20 by way of the coaxial cable 30 to generate an electromagnetic wave of the predetermined frequency and to propagate it in the whole interior of the passenger compartment. When all the doors and windows are closed without any passenger inside, the passenger compartment resonates as a cavity resonator in response to the electromagnetic wave to excite the electromagnetic field at a high efficiency. In FIG. 1, the distribution of the magnetic field is partly illustrated by lines of magnetic force H and lines of electric power E.

Figure 3:
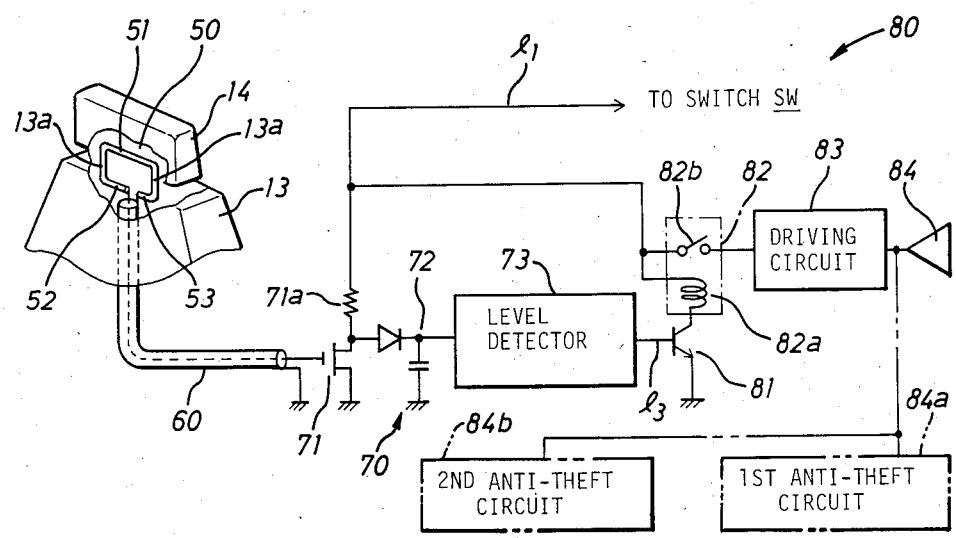
FIG. 3 is a block diagram of a detecting circuit for the detection system.
Figure 4:
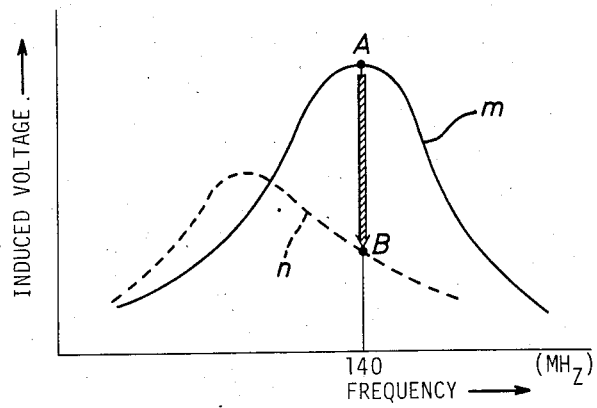
FIG. 4 is a graph illustrating resonance curves in relation to a frequency of an electromagnetic wave propagated in the passenger compartment of the vehicle and an induced voltage to be applied to the detecting circuit.

As is illustrated in FIGS. 1 and 3, the detection system further comprises another loop antenna 50, a detecting circuit 70 contained within a casing 70a installed at a lower portion behind the seat back of an adjacent rear passenger seat 13, and another coaxial cable 60 concealed by the outer layer of the seat back to connect the loop antenna 50 with the detecting circuit 70. As can be well seen in FIG. 3, the loop antenna 50 includes a pair of upright metallic rods 13a, 13a, an upper lateral metallic rod 51 integral with the upper ends of rods 13a, and a pair of lower lateral rods 52, 53 integral with the lower ends of rods 13a. The upper lateral rod 51 is embedded within a head rest 14, while the lower lateral rods 52, 53 are supported by the seat back of rear passenger seat 13 and concealed by an outer layer of the seat back. Thus, the loop antenna 50 receives the magnetic field component of the propagated electromagnetic wave from antenna 40 to generate an induced voltage therefrom. Under resonance of the passenger compartment, the induced voltage of antenna 50 reaches a maximum level when the resonant frequency is 140 MHz. In FIG. 4, such a phenomenon is illustrated by a point A on a resonance curve m. If the door is opened or a human body or its portion enters into the passenger compartment, the level of the induced voltage will drop due to radiation of the electromagnetic wave out of the door or occurrence of conductance caused by conductivity of the human body. Such a phenomenon is illustrated by a point B on a resonance curve n in FIG. 4. The above phenomena will be understood from the fact that the resonance curve m may correspond with a resonance characteristic of an LC resonance circuit equivalently defined by the interior size of the passenger compartment, all the doors and windows of which are closed without any passenger, and that the resonance curve n may correspond with a resonance characteristic where the conductance is connected as a loss component to the LC resonance circuit.

As can be well seen in FIG. 3, the detecting circuit 70 comprises a field effect transistor 71 (hereinafter simply called FET 71), an AM detector or demodulator 72, and a level detector 73. The FET 71 is connected at its gate terminal to the lower lateral rod 52 of loop antenna 50 by way of the coaxial cable 60 and at its source terminal to the user actuable switch SW by way of a resistor 71a and lead wire $l_1$. The FET 71 is further grounded at its drain terminal, and the lower lateral rod 53 is grounded through the coaxial cable 60. When the induced voltage from loop antenna 50 is received through the coaxial cable 60 during closure of the switch SW, the FET 71 generates from its source terminal an output voltage proportional to the induced voltage. The AM detector 72 is responsive to the output voltage from the FET 71 to generate a demodulation voltage which corresponds with the induced voltage of the predetermined frequency. The level detector 73 is responsive to the demodulation voltage from detector 72 to generate an output signal when the demodulation voltage drops below a predetermined level corresponding with the induced voltage defined by the level B on the resonance curve n. Connected to the output terminal of level detector 73 is an alarm circuit 80 which includes a transistor 81, a relay 82, a driving circuit 83 and an alarm buzzer 84. As can be well seen in FIG. 1, the transistor 81 is contained within a casing 80a which is installed within an engine compartment. The transistor 81 is connected at its base to the output terminal of level detector 73 by way of a lead wire $l_3$, and at its collector to an electromagnetic coil 82a of relay 82. Thus, the transistor 81 is energized in response to the output signal from detector 73 to energize the electromagnetic coil 82a. The relay 82 includes a normally open switch 82b which is arranged to be closed in response to energization of coil 81. The driving circuit 83 is responsive to the closing of switch 82b to be supplied with the electric power from battery B through the lead wire $l_1$. The alarm buzzer 84 is triggered in response to an output signal from the driving circuit 83 to sound an alarm so as to give a noisy signal to the proprietor of the vehicle.

Assuming that the vehicle has been parked without any passenger after all the doors and windows were closed and locked and the switch SW was closed, the oscillation cirucit 20 is supplied with electric power from battery B through the lead wire $l_2$, switch SW and lead wire $l_1$ to generate an oscillation signal with the predetermined frequency. The oscillation signal is applied to the loop antenna 40 through the coaxial cable 30 to generate the electromagnetic wave at the predetermined frequency and propagate it in the whole interior of the passenger compartment. Thus, the passenger compartment resonates at the predetermined frequency as a cavity resonator, and the electromagnetic field of the electromagnetic wave is excited at a high efficiency in the whole interior of the compartment. On the other hand, the loop antenna 50 generates an induced voltage, by crossing with the magnetic field component of the electromagnetic wave, and applies it to the detecting circuit 70 through the coaxial cable 60. In this condition, the induced voltage from loop antenna 50 appears at the maximum level, as is illustrated by the point A on the resonance curve m in FIG. 4. Thus, the FET 71 of detecting circuit 70 generates an output voltage in response to the induced voltage, and the AM detector or demodulator 72 generates a demodulation voltage in response to the output voltage from the FET 71. As a result, output signal does not appear from the level detector 73, and the normally open switch 82b of relay 82 is maintained in its open position.

If a thief breaks one of the closed windows and inserts his hand into the passenger compartment to take valuable things left in the compartment, the thief's hand will cause a conductance in the electromagnetic field being excited at the high efficiency. This results in a drop of the induced voltage level to the point B from the point A on the resonance curve n in FIG. 4. Thus, the output voltage from the FET of detecting circuit 70 will drop and in turn, the level detector 73 will generate an output signal in response to the drop of the demodulation voltage from the AM detector 72. Consequently, the transistor 81 becomes conductive in response to the output signal from level detector 73 to energize the electromagnetic coil 82a of relay 82 so as to close the normally open switch 82b of relay 82. Then, the driving circuit 83 is supplied with electric power from battery B through the lead wire $l_2$, switch SW, lead wire $l_1$ and switch 82b, and in turn, the alarm buzzer 84 is triggered by an output signal from driving circuit 83 to sound a noisy alarm. Thus, the detection system makes it harder for the thief to steal the valuable things left in the compartment, and the proprietor of the vehicle is drawn by the noisy alarm to recognize an unauthorized entry into his vehicle. In case the door is opened by the thief, there will occur radiation of the electromagnetic wave out of the passenger compartment through the opened door, resulting in drop of the induced voltage from loop antenna 50. This causes the appearance of the output signal from level detector 73 to trigger the alarm buzzer in the same manner as that in the above-described operation. Thus, the detection system can provide protection against rip-off attempts.

In the actual practices of the present invention, it is desirable that the detection system is further provided with an anti-theft circuit 84a which is arranged to kill the ignition of the vehicle engine and/or with an anti-theft circuit 84b which is arranged to block the fuel line of the vehicle engine in response to the output signal from the driving circuit 83 in the alarm circuit 80. It is also desirable that the user-actuable switch SW in the detection system is arranged to be automatically closed in response to extraction of the ignition key. Furthermore, in another embodiment of the present invention, the upright metallic rods 11a and/or 13a may be utilized as a bar antenna in replacement of the loop antenna 40 and/or 50. Alternatively, a loop or bar antenna may be concealed in an appropriate place in the passenger compartment. It is also apparent that the frequency of the oscillation signal from oscillator 20 is determined in accordance with various interior sizes of the passenger compartment.

Having now fully set forth both structure and operation of the preferred embodiment of the concept underlying the present invention, various other embodiments as well as certain variations and modifications of the embodiment herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. An unauthorized entry detection system for an automotive vehicle having a passenger compartment of a given size, comprising:
   oscillator means, adapted to be disposed in said vehicle, for generating an oscillation signal having a predetermined frequency corresponding to said passenger compartment size;
   first antenna means, adapted to be disposed within said passenger compartment and coupled to said oscillator means, for generating an electromagnetic wave inside said passenger compartment to cause said passenger compartment to resonate as a cavity resonator at said predetermined frequency, said electromagnetic wave corresponding to said oscillation signal;
   second antenna means, adapted to be disposed in said passenger compartment, for generating an induced voltage in response to a magnetic component of said electromagnetic wave; and
   detecting means, coupled to said second antenna means, for detecting a change in said induced voltage and providing a detection signal corresponding to said change.

2. An unauthorized entry detection system as claimed in claim 1, wherein said detecting means includes a detecting circuit connected to said second antenna means to detect said change of the induced voltage and to generate an output signal in response to a drop of the induced voltage below a predetermined level.

3. An unauthorized entry detection system as claimed in claim 1, wherein each of said antenna means includes a pair of upright metallic rods having lower and upper ends, said lower ends being adapted to be supported by a seat back of a passenger seat in said passsenger compartment, said upper ends being adapted to be embedded in a head rest of said passenger seat.

4. An unauthorized entry detection system as claimed in claim 1, wherein each of said antenna means includes a loop antenna having (a) a pair of upright metallic rods with lower and upper ends, said lower ends being adapted to be supported by a seat back of a passenger seat in said passenger compartment, said upper ends being adapted to be embedded in a head rest of said passenger seat, (b) an upper lateral metallic rod integral with the upper ends of said upright metallic rods, and (c) a pair of lower metallic rods integral with the lower ends of said upright metallic rods.

5. An unauthorized entry detection system as claimed in claim 2, wherein said detecting circuit comprises (a) a field effect transistor having a gate terminal coupled to said second antenna, a source terminal adapted to be coupled to an electric power source of said vehicle, and a drain terminal which is grounded, (b) a demodulator having an input terminal coupled to the source terminal of said transistor, and (c) a level detector having an input terminal coupled to an output terminal of said demodulator, and wherein said transistor is energized in response to the induced voltage from said second antenna means to cause said demodulator to generate a demodulation signal, said level detector generating an output signal when a level of said demodulation signal drops below a predetermined level.

6. An unauthorized entry detection system as claimed in claim 1, further comprising (a) a normally open relay switch arranged to be closed in response to the detection signal from said detecting means, (b) a driving circuit arranged to be energized in response to the closing of said relay switch, and (c) alarm means responsive to the energization of said driving circuit to generate an alarm signal.

7. An unauthorized entry detection system as claimed in claim 6, further comprising an anti-theft circuit responsive to energization of said driving circuit to kill an ignition of the vehicle engine.

8. An unauthorized entry detection system as claimed in claim 6, further comprising an anti-theft circuit responsive to energization of said driving circuit to block a fuel line of the vehicle engine.

9. An unauthorized entry detection system as claimed in claim 5, further including a normally open switch adapted to be coupled between the source terminal of said transistor and said electric power source, said switch being closed in response to an extraction of an ignition key from the vehicle to activate said detecting circuit.

10. An unauthorized entry detection system for an automotive vehicle having a passenger compartment of a given size, comprising:
   oscillator means, adapted to be disposed in said vehicle, for generating an oscillation signal having a predetermined frequency corresponding to said passenger compartment size;

first antenna means, adapted to be disposed within said passenger compartment and coupled to said oscillator means, for generating an electromagnetic wave inside said passenger compartment to cause said passenger compartment to resonate as a cavity resonator at said predetermined frequency, said electromagnetic wave corresponding to said oscillation signal, said first antenna means including a first pair of upright metallic rods adapted to be disposed in a passenger seat in said passenger compartment;

second antenna means, adapted to be disposed in said passenger compartment, for generating an induced voltage in response to a magnetic component of said electromagnetic wave, said second antenna means including a second pair of upright metallic rods adapted to be disposed in a passenger seat in said passenger compartment; and detecting means, coupled to said second antenna means, for detecting a change in said induced voltage and providing a detection signal corresponding to said change.

11. An unauthorized entry detection system for an automotive vehicle having a passenger compartment of a given size, comprising:

oscillator means, adapted to be disposed in said vehicle, for generating an oscillation signal having a predetermined frequency corresponding to said passenger compartment size;

first antenna means, adapted to be disposed within said passenger compartment and coupled to said oscillator means, for generating an electromagnetic wave inside said passenger compartment to cause said passenger compartment to resonate as a cavity resonator at said predetermined frequency, said electromagnetic wave corresponding to said oscillation signal, said first antenna means including a first loop antenna adapted to be disposed in a passenger seat in said passenger compartment;

second antenna means, adapted to be disposed in said passenger compartment, for generating an induced voltage in response to a magnetic component of said electromagnetic wave, said second antenna means including a second loop antenna adapted to be disposed in a passenger seat in said passenger compartment; and detecting means, coupled to said second antenna means, for detecting a change in said induced voltage and providing a detection signal corresponding to said change.

* * * * *